(12) United States Patent
Fujimori et al.

(10) Patent No.: US 11,856,168 B2
(45) Date of Patent: Dec. 26, 2023

(54) SHEET CONVEYANCE APPARATUS AND IMAGE FORMING APPARATUS

(71) Applicant: Konica Minolta, Inc., Tokyo (JP)

(72) Inventors: Harumitsu Fujimori, Toyokawa (JP); Shota Igo, Toyokawa (JP); Naoto Sugaya, Hachioji (JP); Kenji Tamaki, Tokorozawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/732,607

(22) Filed: Apr. 29, 2022

(65) Prior Publication Data

US 2022/0368807 A1 Nov. 17, 2022

(30) Foreign Application Priority Data

May 17, 2021 (JP) ................................. 2021-083299

(51) Int. Cl.
*H04N 1/00* (2006.01)
*G03G 15/00* (2006.01)

(52) U.S. Cl.
CPC ..... *H04N 1/00986* (2013.01); *G03G 15/6529* (2013.01); *H04N 1/00037* (2013.01); *H04N 1/00602* (2013.01)

(58) Field of Classification Search
CPC .................. B65H 5/224; B65H 43/00; B65H 2301/5114; B65H 2301/517; B65H 37/00; B65H 2513/10; B65H 2406/31; B65H 2406/322; B65H 2406/32231; B65H 2553/51; B65H 20/02; B65H 2220/01; B65H 23/1882; B65H 2404/253; B65H 2404/2532; B65H 2404/255; B65H 2404/2693; B65H 2515/60; B65H 2553/412; B65H 2801/06; B65H 2801/21; B65H 5/021; B65H 23/046; B65H 23/1806; B65H 2301/51; B65H 2301/51145; B65H 2404/15212; B65H 2511/13; B65H 2511/20; B65H 2511/212; B65H 2511/51; B65H 2511/524; B65H 2513/11; B65H 2515/32; B65H 2515/815; B65H 2553/414; B65H 2555/24; B65H 2701/31; B65H 2701/36; B65H 2801/15; B65H 29/70; B65H 3/5261; B65H 49/18; B65H 5/025; B65H 51/22; B65H 57/14; B65H 59/12; B65H 59/40; B65H 61/005; B65H 67/081;

(Continued)

(56) References Cited

U.S. PATENT DOCUMENTS 4,166,615 A * 9/1979 Noguchi ................ G03G 15/70
271/259
4,933,867 A * 6/1990 Ishigaki ................ G06K 15/10
400/313

(Continued)

FOREIGN PATENT DOCUMENTS

JP 2001-239686 A 9/2001
JP 2005-91857 A 4/2005

*Primary Examiner* — Negussie Worku
(74) *Attorney, Agent, or Firm* — Rankin, Hill & Clark LLP

(57) ABSTRACT

A sheet conveyance apparatus includes: a speed detection roller that detects a conveyance speed of a sheet by coming into contact with the sheet being conveyed and being driven to rotate; and a hardware processor that performs temperature control to make an ambient temperature of the speed detection roller a predetermined temperature.

14 Claims, 5 Drawing Sheets

(58) Field of Classification Search
CPC ............... B65H 7/12; G03G 15/1615; G03G
2215/00645; G03G 15/652; G03G
15/6529; G03G 15/2064; G03G 15/50;
G03G 2215/0119; G03G 2215/0158;
G03G 15/043; G03G 15/1625; G03G
15/2028; G03G 15/2032; G03G 15/6564;
G03G 21/145; G03G 2215/00021; G03G
2215/00143; G03G 2215/00949; G03G
2215/1623; G03G 2215/2016; G03G
2215/2045; G03G 15/0131; G03G
15/0194; G03G 15/2039; G03G 15/206;
G03G 15/5054; G03G 15/5062; G03G
15/6576; G03G 2215/00455; G03G
2215/0059; G03G 2215/2051; H04N
2201/04724; H04N 2201/04734; H04N
1/0473; H04N 1/12; H04N 1/193; H04N
1/506; H04N 2201/02439; H04N
2201/0471; H04N 2201/04786; H04N
2201/04793; H04N 2201/04794; H04N
1/00037; H04N 1/00602; H04N 1/00986;
H04N 1/047; H04N 1/107; H04N 1/40

USPC ........................................................ 358/498
See application file for complete search history.

(56) References Cited

U.S. PATENT DOCUMENTS

| | | | | |
|---|---|---|---|---|
| 5,305,122 | A * | 4/1994 | Hayashi .................. | H04N 1/486 358/448 |
| 6,198,546 | B1 * | 3/2001 | Shimanaka .............. | H04N 1/40 358/473 |
| 6,438,335 | B1 * | 8/2002 | Kinouchi ............ | G03G 15/2039 399/328 |
| 2009/0057987 | A1 * | 3/2009 | Matsumoto .......... | B65H 3/0607 271/114 |
| 2011/0026994 | A1 * | 2/2011 | Ryu .................... | G03G 15/1615 399/396 |
| 2013/0134665 | A1 * | 5/2013 | Asano .................... | B65H 43/00 271/270 |
| 2015/0185669 | A1 * | 7/2015 | Nishinoue .......... | G03G 15/2064 399/328 |
| 2015/0207951 | A1 * | 7/2015 | Soda ........................ | G03G 21/20 358/1.14 |
| 2015/0326742 | A1 * | 11/2015 | Ogino ................ | H04N 1/00458 358/1.13 |
| 2015/0355898 | A1 * | 12/2015 | Zhang .................... | G06F 9/4552 717/169 |
| 2016/0124343 | A1 * | 5/2016 | Sakurai .............. | G03G 15/0849 399/58 |
| 2016/0236889 | A1 * | 8/2016 | Nakamura ............. | G03G 15/55 |
| 2017/0146933 | A1 * | 5/2017 | Yamano ............ | G03G 15/2039 |
| 2018/0312353 | A1 * | 11/2018 | Takai ..................... | B65H 5/062 |
| 2019/0121263 | A1 * | 4/2019 | Tamura .................. | G03G 15/70 |
| 2019/0146397 | A1 * | 5/2019 | Izumiya ............... | G03G 15/553 399/33 |
| 2021/0239609 | A1 * | 8/2021 | Yamada .................. | G02B 5/208 |
| 2021/0311419 | A1 * | 10/2021 | Nakamura ............. | B65G 15/60 |

* cited by examiner

SHEET CONVEYANCE APPARATUS AND IMAGE FORMING APPARATUS

The entire disclosure of Japanese patent Application No. 2021-083299, filed on May 17, 2021, is incorporated herein by reference in its entirety.

BACKGROUND

Technological Field

The present invention relates to a sheet conveyance apparatus and an image forming apparatus.

Description of the Related Art

In general, an image forming apparatus (printer, copier, facsimile, or the like) using electrophotographic process technology forms electrostatic latent images by irradiating (exposing) charged photoconductors with laser light based on image data. Then, toner is supplied from developing devices to the photoconductors (image carriers) on which the electrostatic latent images are formed, whereby the electrostatic latent images are visualized and toner images are formed. After the toner images are directly or indirectly transferred to a sheet, the toner images are heated and pressurized at a fixing nip to be fixed, whereby an image is formed on the sheet.

In addition, an image forming system has been put into practical use in which a sheet feeding apparatus that feeds a continuous sheet (hereinafter, also referred to as "long paper sheet") such as a continuous rolled sheet or a folded sheet and a winding apparatus (sheet ejection apparatus) that winds a long paper sheet on which an image is formed by the image forming apparatus are connected to a front stage and a rear stage of the image forming apparatus described above, respectively.

In an image forming apparatus or an image forming system, the conveyance speed of sheets is controlled on the basis of the rotation speed of conveyance rollers (driving rollers) that convey sheets. However, acquiring the accurate rotation speed of conveyance rollers may have been difficult due to a slip occurring between sheets and the conveyance rollers or change in the roller diameters due to wear of the conveyance rollers.

On the other hand, technique for detecting the conveyance speed of sheets when a speed detection roller driven to rotate by conveyance of sheets (thermosensitive recording sheets) is brought into contact with the sheets, and a detection value of a rotary encoder connected to the speed detection roller is acquired has been provided (see, for example, Japanese Patent Application Laid-Open No. 2001-239686).

However, when the ambient temperature of the speed detection roller changes, the roller diameter of the speed detection roller changes to cause a detection error of the speed detection roller, so that accurate detection of the rotation speed of the speed detection roller and thus the conveyance speed of sheets may have been difficult.

On the other hand, controlling the conveyance speed of sheets in consideration of a detection error of the speed detection roller due to change in the ambient temperature of the speed detection roller is conceivable (see, for example, Japanese Patent Application Laid-Open No. 2005-091857).

However, when the conveyance speed of sheets is controlled in consideration of a detection error of a speed detection roller due to change in the ambient temperature of the speed detection roller, that is, when a control value of the conveyance speed of sheets is always corrected according to the change amount of the ambient temperature of the speed detection roller, the load of control processing for controlling the conveyance speed of sheets by the correction processing increases, and control delay occurs, which has been disadvantageous.

SUMMARY

An object of the present invention is to provide a sheet conveyance apparatus and an image forming apparatus capable of preventing occurrence of control delay when the conveyance speed of sheets is controlled.

To achieve the abovementioned object, according to an aspect of the present invention, a sheet conveyance apparatus reflecting one aspect of the present invention comprises: a speed detection roller that detects a conveyance speed of a sheet by coming into contact with the sheet being conveyed and being driven to rotate; and a hardware processor that performs temperature control to make an ambient temperature of the speed detection roller a predetermined temperature.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
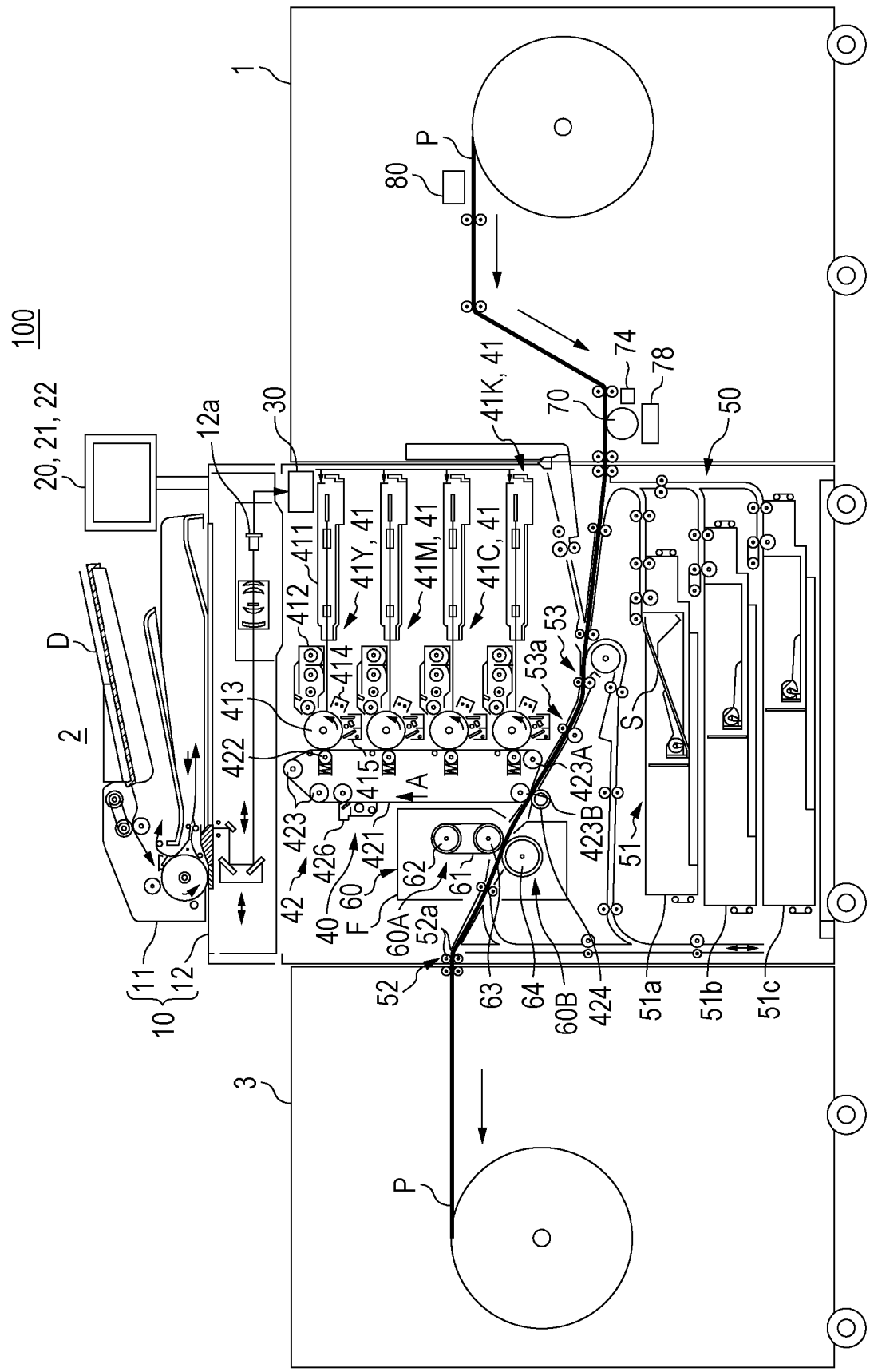
FIG. 1 is a diagram illustrating a configuration of an image forming system.
Figure 2:
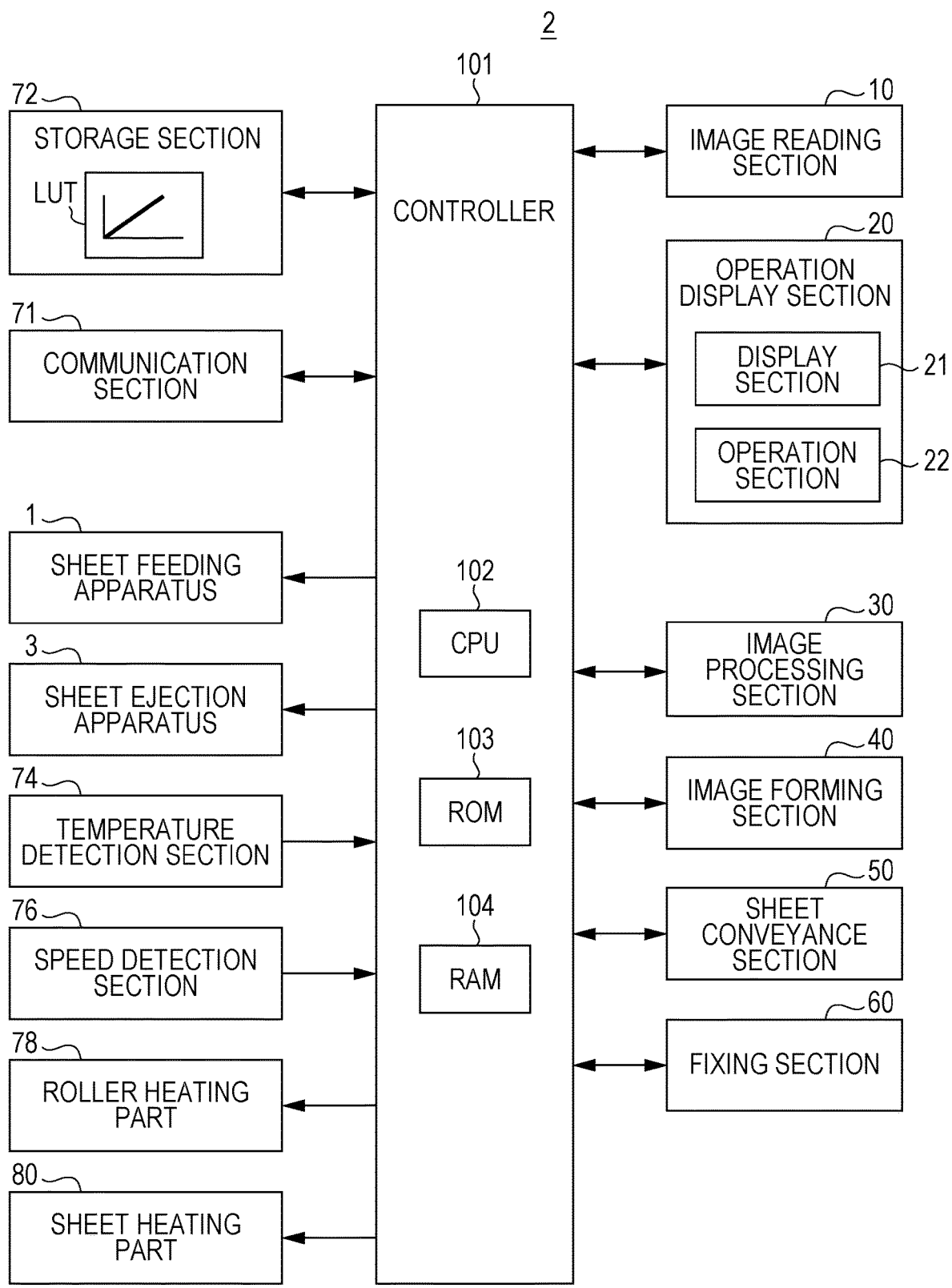
FIG. 2 is a block diagram illustrating a functional configuration of the image forming system.

Hereinafter, one or more embodiments of the present invention will be described with reference to the drawings. However, the scope of the invention is not limited to the disclosed embodiments. FIG. 1 is a diagram schematically illustrating an overall configuration of an image forming system 100 according to the present embodiment. FIG. 2 illustrates a main part of a control system of an image forming apparatus 2 included in the image forming system 100 according to the present embodiment.

The image forming system 100 is a system that forms an image on a long paper sheet P or a sheet S (non-long paper sheet) indicated by a thick line in FIG. 1 using the long paper sheet P or the sheet S as a recording medium. Here, the long paper sheet P is, for example, a continuous sheet or a rolled sheet having a length that exceeds the main body width of the image forming apparatus 2 in the conveyance direction.

As illustrated in FIG. 1, the image forming system 100 includes a sheet feeding apparatus 1, the image forming apparatus 2, and a sheet ejection apparatus 3 that are connected from the upstream side along the conveyance direction of a long paper sheet P (hereinafter, also referred to as a "sheet conveyance direction"). The sheet feeding apparatus 1 and the sheet ejection apparatus 3 are used in a case where an image is formed on a long paper sheet P. Note that the image forming system 100 functions as the "image forming apparatus" of the present invention.

The sheet feeding apparatus 1 is an apparatus that feeds a long paper sheet P to the image forming apparatus 2. In the housing of the sheet feeding apparatus 1, a long paper sheet P in rolled form is wound around a support shaft and rotatably held as illustrated in FIG. 1. The sheet feeding apparatus 1 conveys the long paper sheet P wound around the support shaft to the image forming apparatus 2 at a constant speed (target speed) via a plurality of conveyance roller pairs (for example, delivery rollers, sheet feeding rollers, and the like). The sheet feeding operation of the sheet feeding apparatus 1 is controlled by a controller 101 included in the image forming apparatus 2.

Note that, in the sheet feeding apparatus 1, the long paper sheet P is not necessarily held in rolled form, and a plurality of long paper sheets P having a predetermined size (for example, 210 [mm]×1200 [mm]) may be held.

The image forming apparatus 2 is an intermediate transfer type color image forming apparatus using electrophotographic process technology. That is, the image forming apparatus 2 primarily transfers toner images of individual colors of yellow (Y), magenta (M), cyan (C), and black (K) formed on photoconductor drums 413 to an intermediate transfer belt 421, superimposes the toner images of the four colors on the intermediate transfer belt 421, and then secondarily transfers the toner images to a long paper sheet P fed from the sheet feeding apparatus 1 or a sheet S fed from any of sheet feeding tray units 51a to 51c, thereby forming an image.

The image forming apparatus 2 adopts a tandem system in which the photoconductor drums 413 corresponding to the four colors of Y, M, C, and K are arranged in series in the traveling direction of the intermediate transfer belt 421, and toner images of the individual colors are sequentially transferred to the intermediate transfer belt 421 in one procedure.

As illustrated in FIG. 2, the image forming apparatus 2 includes an image reading section 10, an operation display section 20, an image processing section 30, an image forming section 40, a sheet conveyance section 50, a fixing section 60, and the controller 101.

The controller 101 includes a central processing unit (CPU) 102, a read only memory (ROM) 103, a random access memory (RAM) 104, and the like. The CPU 102 reads a program corresponding to processing content from the ROM 103, deploys the program in the RAM 104, and centrally controls operation of each block and the like of the image forming apparatus 2 in cooperation with the deployed program. At this time, various types of data stored in a storage section 72 are referred to. The storage section 72 is formed by using, for example, a non-volatile semiconductor memory (so-called flash memory) or a hard disk drive.

The controller 101 transmits and receives various types of data to and from an external device (for example, a personal computer) connected to a communication network such as a local area network (LAN) or a wide area network (WAN) via a communication section 71. For example, the controller 101 receives image data transmitted from the external device, and forms an image on a long paper sheet P or a sheet S on the basis of the image data (input image data). The communication section 71 is formed by using, for example, a communication control card such as a LAN card.

The image reading section 10 includes an automatic document feeding apparatus 11 referred to as an auto document feeder (ADF), a document image scanning apparatus (scanner) 12, and the like.

The automatic document feeding apparatus 11 conveys a document D placed on a document tray by a conveying mechanism and sends the document D to the document image scanning apparatus 12. The automatic document feeding apparatus 11 enables images of a large number of documents D (including both sides) placed on the document tray to be successively read at once.

The document image scanning apparatus 12 optically scans a document that has been conveyed onto a contact glass from the automatic document feeding apparatus 11 or a document placed on the contact glass, forms an image of reflected light from the document on a light receiving surface of a charge coupled device (CCD) sensor 12a, and reads the document image. The image reading section 10 generates input image data on the basis of the reading result by the document image scanning apparatus 12. The input image data is subjected to predetermined image processing in the image processing section 30.

The operation display section 20 is formed by using, for example, a liquid crystal display (LCD) including a touch panel, and functions as a display section 21 and an operation section 22. The display section 21 displays various operation screens, a state of an image, operation status of each function, and the like according to a display control signal input from the controller 101. The operation section 22 includes various operation keys such as a numeric keypad and a start key, receives various input operations by a user, and outputs an operation signal to the controller 101.

The image processing section 30 includes a circuit and the like that performs digital image processing on input image data according to an initial setting or a user setting. For example, the image processing section 30 performs tone correction on the basis of tone correction data (tone correction table) under the control of the controller 101. In addition to the tone correction, the image processing section 30 performs various types of correction processing such as color correction and shading correction, compression processing, and the like on the input image data. The image forming section 40 is controlled on the basis of the image data on which those types of processing have been performed.

The image forming section 40 includes image forming units 41Y, 41M, 41C, and 41K for forming images using toner of individual colors of a Y component, an M component, a C component, and a K component on the basis of the input image data, an intermediate transfer unit 42, and the like.

The image forming units 41Y, 41M, 41C, and 41K for a Y component, an M component, a C component, and a K component have similar configurations. For convenience of illustration and description, common elements are denoted by the same reference signs, and Y, M, C, or K is added to the reference signs in a case where the elements are distinguished. In FIG. 1, only the elements of the image forming unit 41Y for a Y component are denoted by reference signs, and the reference signs of the elements of the other image forming units 41M, 41C, and 41K are omitted.

An image forming unit 41 includes an exposing device 411, a developing device 412, a photoconductor drum 413, a charging device 414, a drum cleaning device 415, and the like.

The photoconductor drum 413 is, for example, a negative charge type organic photo-conductor (OPC) in which an under coat layer (UCL), a charge generation layer (CGL), and a charge transport layer (CTL) are sequentially laminated on the peripheral surface of an aluminum conductive cylindrical body (aluminum tube stock) having a drum diameter of 80 [mm]. The charge generation layer is formed from an organic semiconductor including a resin binder (for example, polycarbonate) in which a charge generation material (for example, phthalocyanine pigment) is dispersed, and generates a pair of a positive charge and a negative charge by being exposed by the exposing devices 411. The charge transport layer is formed from a resin binder (for example, polycarbonate resin) in which a hole transport material (electron-donating nitrogen-containing compound) is dispersed, and transports the positive charge generated in the charge generation layer to the surface of the charge transport layer.

The controller 101 rotates the photoconductor drum 413 at a constant peripheral speed by controlling a driving current supplied to a driving motor (not illustrated) that rotates the photoconductor drum 413.

The charging device 414 uniformly charges the surface of the photoconductor drum 413 having photoconductivity to negative polarity. The exposing device 411 includes, for example, a semiconductor laser, and irradiates the photoconductor drum 413 with laser light corresponding to an image of an individual color component. A positive charge is generated in the charge generation layer of the photoconductor drum 413 and transported to the surface of the charge transport layer, whereby a surface charge (negative charge) of the photoconductor drum 413 is neutralized. An electrostatic latent image of the individual color component is formed on the surface of the photoconductor drum 413 due to potential difference from the surroundings.

The developing device 412 is a developing device using a two-component developing system, and forms a toner image by visualizing the electrostatic latent image by adhering toner of the individual color component to the surface of the photoconductor drum 413.

The drum cleaning device 415 includes a drum cleaning blade and the like in sliding contact with the surface of the photoconductor drum 413, and removes transfer residual toner that remains on the surface of the photoconductor drum 413 after primary transfer.

The intermediate transfer unit 42 includes an intermediate transfer belt 421, primary transfer rollers 422, a plurality of support rollers 423, a secondary transfer roller 424, a belt cleaning device 426, and the like.

The intermediate transfer belt 421 is formed by using an endless belt, and is stretched around the plurality of the support rollers 423 in loop form. At least one of the plurality of the support rollers 423 is formed by using a driving roller, and the others are driven rollers. For example, a roller 423A arranged on the downstream side in the belt traveling direction relative to a primary transfer roller 422 for a K component is preferably a driving roller. Accordingly, the traveling speed of the belt in a primary transfer portion is easily kept constant. By rotation of the driving roller 423A, the intermediate transfer belt 421 travels at a constant speed in the direction of an arrow A.

The intermediate transfer belt 421 is a belt having conductivity and elasticity, and includes a high resistance layer having volume resistivity of 8 to 11 [log Ω·cm] on the surface. The intermediate transfer belt 421 is rotationally driven by a control signal from the controller 101. Note that the material, thickness, and hardness of the intermediate transfer belt 421 are not limited as long as the intermediate transfer belt 421 has conductivity and elasticity.

The primary transfer rollers 422 are arranged on the inner peripheral surface side of the intermediate transfer belt 421 so as to face the photoconductor drums 413 of individual color components. The primary transfer rollers 422 are pressed against the photoconductor drums 413 via the intermediate transfer belt 421, thereby forming a primary transfer nip for transferring toner images from the photoconductor drums 413 onto the intermediate transfer belt 421.

The secondary transfer roller 424 is arranged on the outer peripheral surface side of the intermediate transfer belt 421 so as to face a backup roller 423B arranged on the downstream side in the belt traveling direction of the driving roller 423A. The secondary transfer roller 424 is pressed against the backup roller 423B via the intermediate transfer belt 421, thereby forming a secondary transfer nip for transferring toner images from the intermediate transfer belt 421 onto a long paper sheet P or a sheet S.

When the intermediate transfer belt 421 passes through the primary transfer nip, toner images on the photoconductor drums 413 are sequentially superimposed to be primarily transferred onto the intermediate transfer belt 421. Specifically, primary transfer bias is applied to the primary transfer rollers 422, and a charge having polarity opposite to that of the toner is applied to the rear surface side (side in contact with the primary transfer rollers 422) of the intermediate transfer belt 421, whereby the toner images are electrostatically transferred onto the intermediate transfer belt 421.

Thereafter, when a long paper sheet P or a sheet S passes through the secondary transfer nip, the toner images on the intermediate transfer belt 421 are secondarily transferred onto the long paper sheet P or the sheet S. Specifically, secondary transfer bias is applied to the secondary transfer roller 424, and a charge having polarity opposite to that of the toner is applied to the rear surface side (side in contact with the secondary transfer roller 424) of the long paper sheet P or the sheet S, whereby the toner images are electrostatically transferred onto the long paper sheet P or the sheet S. The long paper sheet P or the sheet S onto which the toner images have been transferred is conveyed toward the fixing section 60.

The belt cleaning device 426 removes transfer residual toner that remains on the surface of the intermediate transfer belt 421 after secondary transfer. Note that, instead of the secondary transfer roller 424, a configuration in which a secondary transfer belt is stretched in loop form by a plurality of support rollers including a secondary transfer roller (so-called belt type secondary transfer unit) may be adopted.

The fixing section 60 includes an upper fixing section 60A including a fixing surface side member arranged on the fixing surface (surface on which toner images are formed) side of a long paper sheet P or a sheet S faces, a lower fixing section 60B including a rear surface side support member arranged on the rear surface (surface opposite to the fixing surface) side of a long paper sheet P or a sheet S faces, and the like. The fixing surface side member and the rear surface side support member pressed against the fixing surface side member form a fixing nip that conveys the long paper sheet P or the sheet S held therebetween.

The fixing section 60 fixes toner images on a long paper sheet P or a sheet S that has been conveyed after secondarily transfer of the toner images by heating and pressurizing the long paper sheet P or the sheet S at the fixing nip. The fixing section 60 is provided as a unit in a fixing device F. In the fixing device F, an air separation unit that separates a long paper sheet P or a sheet S from the fixing surface side member or the rear surface side support member by blowing air may be provided.

The upper fixing section 60A includes an endless fixing belt 61 that is the fixing surface side member, a heating roller 62, and a fixing roller 63 (belt heating type). The fixing belt 61 is stretched around the heating roller 62 and the fixing roller 63 with a predetermined belt tension (for example, 40 [N]).

The fixing belt 61, for example, includes a substrate formed by using polyimide (PI) having a thickness of 80 [μm], an elastic layer that coats the outer peripheral surface of the substrate and that is heat-resistant silicon rubber (hardness JIS-A30°) having a thickness of 250 [μm], and a surface layer (release layer) that coats the elastic layer with perfluoroalkoxy (PFA) that is a heat-resistant resin having a thickness of 70 μm. The outer diameter dimension of the fixing belt 61 is, for example, 100 [mm]. The fixing belt 61 comes into contact with a long paper sheet P or a sheet S on which toner images are formed, and heats and fixes the toner images on the long paper sheet P or the sheet S at a fixing temperature (for example, 160 to 200 [° C.]). Here, the fixing temperature is a temperature that enables supply of the heat amount necessary for melting toner on a long paper sheet P or a sheet S, and varies depending on the sheet type and the like of a long paper sheet P or a sheet S on which an image is formed.

The heating roller 62 incorporates a heating source (halogen heater) and heats the fixing belt 61. The heating roller 62 is heated by the heating source, and as a result, the fixing belt 61 is heated. The temperature of the heating source is controlled by the controller 101 to make the temperature of the fixing belt 61 a set temperature that is, for example, 180 [° C.]. The outer diameter dimension of the heating roller 62 is, for example, 50 [mm].

The fixing roller 63 has, for example, a configuration in which an elastic layer (for example, thickness: 10 [mm]) formed from silicone rubber or the like and a surface layer (for example, thickness: 70 [μm]) formed from a fluorine-based resin such as polytetrafluoroethylene (PTFE) are sequentially laminated on the outer peripheral surface of a cylindrical core metal formed from aluminum or the like. The outer diameter dimension of the fixing roller 63 is, for example, 40 [mm]. Drive control of the fixing roller 63 (for example, on/off of rotation, peripheral speed, and the like) is performed by the controller 101. The controller 101 rotates the fixing roller 63 in the clockwise direction. By the rotation of the fixing roller 63, the fixing belt 61 and the heating roller 62 are driven to rotate in the clockwise direction.

The lower fixing section 60B includes a pressure roller 64 that is the rear surface side support member (roller pressure type). The pressure roller 64, for example, has a configuration in which an elastic layer formed from silicone rubber or the like and a surface layer formed from a perfluoroalkoxy alkane (PFA) tube are sequentially laminated on the outer peripheral surface of a cylindrical core metal formed from iron or the like. The outer diameter dimension of the pressure roller 64 is, for example, 40 [mm]. The pressure roller 64 is pressed against the fixing roller 63 via the fixing belt 61 by a pressing/separation section (not illustrated) with a predetermined fixing load (for example, 1000 [N]). The pressing/separation section has a known configuration, and presses the pressure roller 64 against the fixing belt 61 or separates the pressure roller 64 from the fixing belt 61. In this manner, between the fixing belt 61 and the pressure roller 64, the fixing nip that conveys a sheet S held therebetween is formed. Drive control of the pressure roller 64 (for example, on/off of rotation, peripheral speed, and the like) and drive control of the pressing/separation section are performed by the controller 101. The controller 101 rotates the pressure roller 64 in the counterclockwise direction.

The sheet conveyance section 50 includes a sheet feeding section 51, a sheet ejection section 52, a conveyance path section 53, and the like. In three sheet feeding tray units 51*a* to 51*c* included in the sheet feeding section 51, sheets S (such as standard sheets and special sheets) discriminated on the basis of the basis weight, the size, and the like are stored separately in corresponding preset types. The conveyance path section 53 includes a plurality of conveyance roller pairs including a registration roller pair 53*a*. A registration roller section in which the registration roller pair 53*a* is provided corrects inclination and deviation of sheets S or a long paper sheet P.

Sheets S stored in the sheet feeding tray units 51*a* to 51*c* are sent out one by one from the top, and are conveyed to the image forming section 40 by the conveyance path section 53. In the image forming section 40, toner images on the intermediate transfer belt 421 are secondarily transferred collectively onto one surface of each of the sheets S, and the fixing process is performed in the fixing section 60. A long paper sheet P fed from the sheet feeding apparatus 1 to the image forming apparatus 2 is conveyed to the image forming section 40 by the conveyance path section 53. Then, in the image forming section 40, toner images on the intermediate transfer belt 421 are secondarily transferred collectively onto one surface of the long paper sheet P, and the fixing process is performed in the fixing section 60. The long paper sheet P or each of the sheets S on which an image is formed is conveyed to the sheet ejection apparatus 3 by the sheet ejection section 52 including a conveyance roller pair (sheet ejection roller pair) 52*a*.

The sheet ejection apparatus 3 is an apparatus that winds a long paper sheet P that has been conveyed from the image forming apparatus 2. In the housing of the sheet ejection apparatus 3, a long paper sheet P is wound around a support shaft and rotatably held in rolled form as illustrated in FIG. 1. For that purpose, the sheet ejection apparatus 3 winds the long paper sheet P that has been conveyed from the image forming apparatus 2 around the support shaft at a constant speed via a plurality of the conveyance roller pairs (for example, delivery rollers and sheet ejection rollers). The winding operation of the sheet ejection apparatus 3 is controlled by the controller 101 included in the image forming apparatus 2.

In the image forming system 100 described above, the conveyance speed of a long paper sheet P is controlled on the basis of the rotation speed of the conveyance rollers (driving rollers) that convey the long paper sheet P. However, acquiring the accurate rotation speed of the conveyance rollers may be difficult due to a slip occurring between a long paper sheet P and the conveyance rollers or change in the roller diameters due to wear of the conveyance rollers.

On the other hand, technique for detecting the conveyance speed of sheets when a speed detection roller driven to rotate by conveyance of sheets (thermosensitive recording sheets) is brought into contact with the sheets, and a detection value of a rotary encoder connected to the speed detection roller is acquired has been provided (see, for example, Japanese Patent Application Laid-Open No. 2001-239686). However, when the ambient temperature of the speed detection roller changes, the roller diameter of the speed detection roller changes to cause a detection error of the speed detection roller, so that accurate detection of the rotation speed of the speed detection roller and thus the conveyance speed of sheets may be difficult.

On the other hand, controlling the conveyance speed of sheets in consideration of a detection error of the speed detection roller due to change in the ambient temperature of the speed detection roller is conceivable (see, for example, Japanese Patent Application Laid-Open No. 2005-091857). However, when the conveyance speed of sheets is controlled in consideration of a detection error of the speed detection roller due to change in the ambient temperature of the speed detection roller, that is, when a control value of the conveyance speed of sheets is always corrected according to the change amount of the ambient temperature of the speed detection roller, the load of control processing for controlling the conveyance speed of sheets by the correction processing increases, and control delay occurs.

Therefore, in the present embodiment, in order to prevent occurrence of the control delay when the conveyance speed of a long paper sheet P is controlled, the controller 101 performs temperature control to make the ambient temperature of a speed detection roller a predetermined temperature. Accordingly, controlling the conveyance speed of a long paper sheet P in consideration of a detection error of the speed detection roller due to change in the ambient temperature of the speed detection roller, that is, correcting a control value of the conveyance speed of a long paper sheet P according to the change amount of the ambient temperature of the speed detection roller is not necessary. As a result, occurrence of the control delay due to increase in the load of the control processing for controlling the conveyance speed of a long paper sheet P can be prevented. Note that the controller 101 functions as a "temperature controller" and a "conveyance controller" of the present invention.

Hereinafter, a configuration for performing temperature control to make the ambient temperature of the speed detection roller a predetermined temperature will be described. As illustrated in FIG. 1, the sheet feeding apparatus 1 includes a speed detection roller 70, a temperature detection section 74, a speed detection section 76, a roller heating part 78, and a sheet heating part 80. Note that the sheet feeding apparatus 1 and the controller 101 functions as a "sheet conveyance apparatus" of the present invention.

The speed detection roller 70 detects the conveyance speed of a long paper sheet P by being driven to rotate in contact with the rear surface of the long paper sheet P being conveyed in the sheet feeding apparatus 1. A rotary encoder (not illustrated) is connected to the speed detection roller 70. The rotary encoder functions as the speed detection section 76 that detects the rotation speed of the speed detection roller 70 and thus the conveyance speed of a long paper sheet P. The speed detection section 76 detects the conveyance speed of a long paper sheet P and outputs the detection result to the controller 101 (see FIG. 2).

The temperature detection section 74 is a non-contact temperature sensor that is provided in the vicinity of the speed detection roller 70 and detects the ambient temperature of the speed detection roller 70. The temperature detection section 74 detects the ambient temperature of the speed detection roller 70 and outputs the detection result to the controller 101 (see FIG. 2).

The roller heating part 78 is a heater that is provided in the vicinity of the speed detection roller 70 and heats the speed detection roller 70 under the control of the controller 101. As the heater, a resistor heater including a ceramic heater, a heat ray emitting type heater, a heater that heats the speed detection roller 70 by a microwave or the like can be used.

The sheet heating part 80 is a heater that is provided on a side on which the front surface of a long paper sheet P being conveyed faces and heats the long paper sheet P being conveyed in the sheet feeding apparatus 1 under the control of the controller 101. As a heater, a resistor heater including a ceramic heater, a heat ray emitting type heater, a heater that heats a long paper sheet P by a microwave, or the like can be used.

The controller 101 performs temperature control to make the ambient temperature of the speed detection roller 70 a predetermined temperature (target temperature). In the present embodiment, the controller 101 controls on/off (ON/OFF) of heating of the roller heating part 78 (heater) to make the ambient temperature of the speed detection roller 70 a predetermined temperature.

A direct current (DC) power supply device and a commercial (alternating current, AC) power supply device may be used to control the roller heating part 78 and the sheet heating part 80. In a case where a commercial (AC) power supply device is used, for example, 10 half-waves of the commercial (AC) power supply device are set as a control cycle, and the power (heating amount) of the heater is changed by being turned ON/OFF every half-wave.

Figure 3:
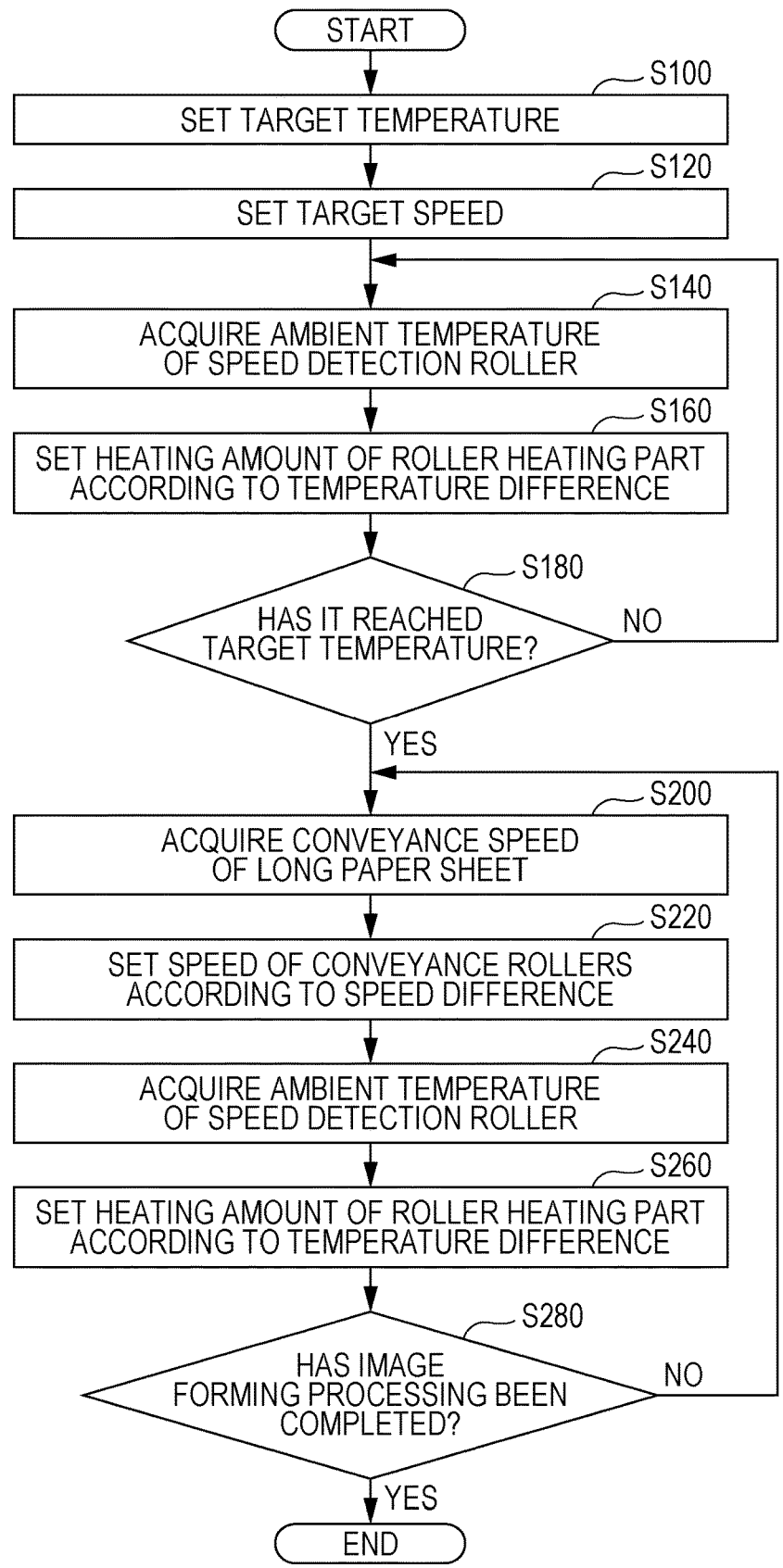
FIG. 3 is a flowchart illustrating an example of conveyance control operation of the image forming system.

Next, conveyance control operation of the image forming system 100 will be described. FIG. 3 is a flowchart illustrating an example of the conveyance control operation of the image forming system 100. Processing in step S100 in FIG. 3 is started when a performance instruction of a print job is generated in the image forming system 100.

First, the controller 101 sets a target temperature for the ambient temperature of the speed detection roller 70 according to the print job (image forming condition) and the environmental temperature (step S100).

Next, the controller 101 sets a target speed for the conveyance speed of a long paper sheet P that is conveyed by the conveyance rollers in the image forming system 100 (step S120).

Next, the controller 101 acquires the ambient temperature of the speed detection roller 70 as a detection result of the temperature detection section 74 (step S140).

Next, the controller 101 sets a heating amount of the roller heating part 78 for heating the speed detection roller 70 according to the temperature difference between the target temperature and the ambient temperature of the speed detection roller 70 acquired in step S140 to make the ambient temperature of the speed detection roller 70 the target temperature (step S160).

Next, the controller 101 acquires the ambient temperature of the speed detection roller 70 from the temperature detection section 74, and determines whether the acquired ambient temperature has reached the target temperature (step S180). In a case where the result of the determination indicates that the acquired ambient temperature has not reached the target temperature (step S180, NO), the processing returns to step S140.

On the other hand, in a case where the acquired ambient temperature has reached the target temperature (step S180, YES), the controller 101 starts performance of image forming processing according to the print job.

Next, the controller 101 acquires the rotation speed of the speed detection roller 70 and thus the conveyance speed of the long paper sheet P as a detection result of the speed detection section 76 (step S200).

Next, the controller 101 sets the speed (rotation speed) of the conveyance rollers that convey the long paper sheet P according to the speed difference between the target speed and the conveyance speed of the long paper sheet P acquired in step S200 to make the conveyance speed of the long paper sheet P the target speed (step S220).

Next, the controller 101 acquires the ambient temperature of the speed detection roller 70 as a detection result of the temperature detection section 74 (step S240).

Next, the controller 101 sets a heating amount of the roller heating part 78 for heating the speed detection roller 70 according to the temperature difference between the target temperature and the ambient temperature of the speed detection roller 70 acquired in step S240 to make the ambient temperature of the speed detection roller 70 the target temperature (step S260).

Finally, the controller 101 determines whether the performance of the image forming processing according to the print job has been completed (step S280). In a case where the result of the determination indicates that the performance of the image forming processing according to the print job has not been completed (step S280, NO), the processing returns to step S200. On the other hand, in a case where the performance of the image forming processing according to the print job has been completed (step S280, YES), the image forming system 100 ends the conveyance control operation in FIG. 3.

Note that the setting of the target temperature for the ambient temperature of the speed detection roller 70 may be changed during the performance of the image forming processing. For example, in a case where the temperature difference between the ambient temperature of the speed detection roller 70 and the target temperature is large, the controller 101 changes the setting of the target temperature to increase the temperature difference and increases the heating amount of the roller heating part 78 for heating the speed detection roller 70. As a result, even in a case where the temperature difference between the ambient temperature of the speed detection roller 70 and the target temperature is large, the ambient temperature of the speed detection roller 70 can reach the target temperature in a short time.

As described above in detail, the controller 101 performs the temperature control to make the ambient temperature of the speed detection roller 70 a predetermined temperature (target temperature). Specifically, the controller 101 sets a heating amount of the roller heating part 78 for heating the speed detection roller 70 according to the temperature difference between the target temperature and the ambient temperature of the speed detection roller 70 to make the ambient temperature of the speed detection roller 70 the target temperature.

According to the present embodiment formed as described above, the ambient temperature of the speed detection roller 70 is controlled to be a constant temperature (target temperature), and accordingly, controlling the conveyance speed of a long paper sheet P in consideration of a detection error of the speed detection roller 70 due to change in the ambient temperature of the speed detection roller 70, that is, correcting a control value of the conveyance speed of a long paper sheet P according to the change amount of the ambient temperature of the speed detection roller 70 is not necessary. As a result, occurrence of the control delay due to increase in the load of the control processing for controlling the conveyance speed of a long paper sheet P can be prevented.

Note that, in the embodiment described above, an example in which the controller 101 controls the heating operation of the roller heating part 78 to make the ambient temperature of the speed detection roller 70 a predetermined temperature (target temperature) has been described, however, the present invention is not limited thereto. For example, the controller 101 may control the heating operation of the sheet heating part 80 instead of the roller heating part 78 to make the ambient temperature of the speed detection roller 70 a predetermined temperature (target temperature).

In this case, the controller 101 controls on/off of heating of the sheet heating part 80 (heater) to make the ambient temperature of the speed detection roller 70 a predetermined temperature, specifically, to make the temperature of a long paper sheet P the predetermined temperature when the speed detection roller 70 comes into contact with the long paper sheet P being conveyed. Accordingly, the long paper sheet P being conveyed is preliminarily heated, and when the speed detection roller 70 comes into contact with the long paper sheet P, decrease in the temperature of the speed detection roller 70 due to heat absorption by the long paper sheet P is reduced. As a result, the ambient temperature of the speed detection roller 70 is controlled to be a constant temperature (target temperature), and accordingly, controlling the conveyance speed of a long paper sheet P in consideration of a detection error of the speed detection roller 70 due to change in the ambient temperature of the speed detection roller 70, that is, correcting a control value of the conveyance speed of a long paper sheet P according to the change amount of the ambient temperature of the speed detection roller 70 is not necessary. As a result, occurrence of the control delay due to increase in the load of the control processing for controlling the conveyance speed of a long paper sheet P can be prevented.

When the heating operation of the sheet heating part 80 is controlled to make the ambient temperature of the speed detection roller 70 a predetermined temperature (target temperature), the controller 101 may control a heating amount of the sheet heating part 80 according to the conveyance speed (for example, an actual conveyance speed or a preset conveyance speed) of a long paper sheet P that is conveyed. In this case, in a case where the conveyance speed of a long paper sheet P that is conveyed is high, the controller 101 increases a heating amount of the sheet heating part 80 in consideration that the temperature decrease amount of the speed detection roller 70 due to heat absorption by the long paper sheet P when the speed detection roller 70 comes into contact with the long paper sheet P is large. On the other hand, in a case where the conveyance speed of a long paper sheet P that is conveyed is low, the controller 101 decreases a heating amount of the sheet heating part 80 in consideration that the temperature decrease amount of the speed detection roller 70 due to heat absorption by the long paper sheet P when the speed detection roller 70 comes into contact with the long paper sheet P is small.

When the heating operation of the sheet heating part 80 is controlled to make the ambient temperature of the speed detection roller 70 a predetermined temperature (target temperature), the controller 101 may control a heating amount of the sheet heating part 80 according to the actual temperature change amount of the speed detection roller 70 when the speed detection roller 70 comes into contact with a long paper sheet P being conveyed. In this case, in a case where the actual temperature change amount of the speed detection roller 70 is large, that is, in a case where the temperature decrease amount of the speed detection roller 70 due to heat absorption by a long paper sheet P when the speed detection roller 70 comes into contact with the long paper sheet P is large, the controller 101 increases a heating amount of the sheet heating part 80. On the other hand, in a case where the actual temperature change amount of the speed detection roller 70 is small, that is, in a case where the temperature decrease amount of the speed detection roller 70 due to heat absorption by a long paper sheet P when the speed detection roller 70 comes into contact with the long paper sheet P is small, the controller 101 decreases a heating amount of the sheet heating part 80.

When the heating operation of the sheet heating part 80 is controlled to make the ambient temperature of the speed detection roller 70 a predetermined temperature (target temperature), the controller 101 may control a heating amount of the sheet heating part 80 according to the type (for example, difference in basis weight or water content) of a long paper sheet P that is conveyed. In this case, for example, in a case where the basis weight of a long paper sheet P (thick sheet) that is conveyed is large, that is, in a case where the temperature decrease amount of the speed detection roller 70 due to heat absorption by the long paper sheet P when the speed detection roller 70 comes into contact with the long paper sheet P is large, the controller 101 increases a heating amount of the sheet heating part 80. On the other hand, for example, in a case where the basis weight of a long paper sheet P (thin sheet) that is conveyed is small, that is, in a case where the temperature decrease amount of the speed detection roller 70 due to heat absorption by the long paper sheet P when the speed detection roller 70 comes into contact with the long paper sheet P is small, the controller 101 decreases a heating amount of the sheet heating part 80.

Figure 4:
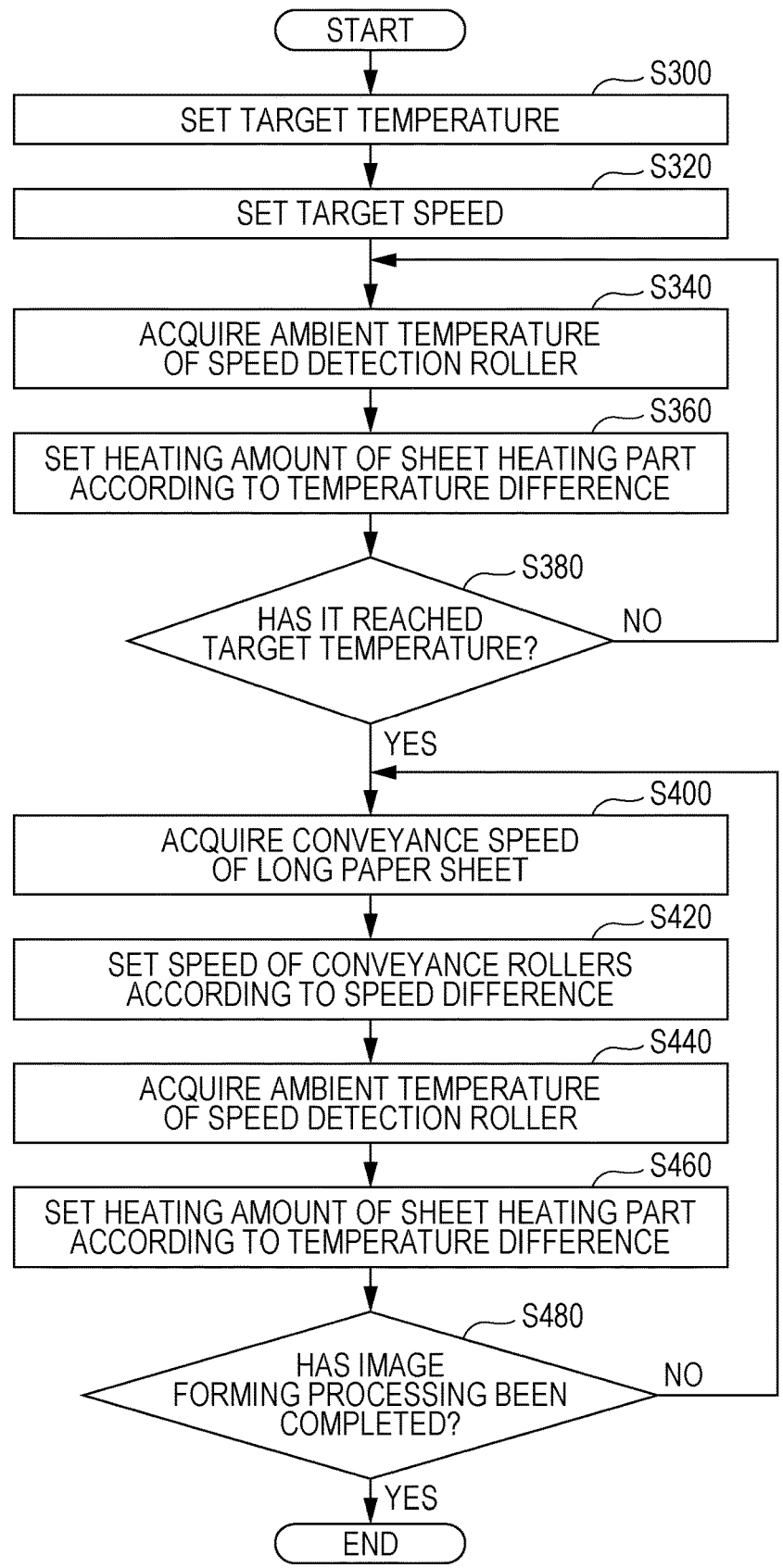
FIG. 4 is a flowchart illustrating a modification of the conveyance control operation of the image forming system.

Next, conveyance control operation of the image forming system 100 when the heating operation of the sheet heating part 80 is controlled will be described. FIG. 4 is a flowchart illustrating an example of the conveyance control operation of the image forming system 100 when the heating operation of the sheet heating part 80 is controlled. Processing in step S100 in FIG. 4 is started when a performance instruction of a print job is generated in the image forming system 100.

First, the controller 101 sets a target temperature for the ambient temperature of the speed detection roller 70 according to the print job (image forming condition) and the environmental temperature (step S300).

Next, the controller 101 sets a target speed for the conveyance speed of a long paper sheet P that is conveyed by the conveyance rollers in the image forming system 100 (step S320).

Next, the controller 101 acquires the ambient temperature of the speed detection roller 70 as a detection result of the temperature detection section 74 (step S340).

Next, the controller 101 sets a heating amount of the sheet heating part 80 for heating a long paper sheet P that is conveyed according to the temperature difference between the target temperature and the ambient temperature of the speed detection roller 70 acquired in step S340 to make the ambient temperature of the speed detection roller 70 the target temperature (step S360).

Next, the controller 101 acquires the ambient temperature of the speed detection roller 70 from the temperature detection section 74, and determines whether the acquired ambient temperature has reached the target temperature (step S380). In a case where the result of the determination indicates that the acquired ambient temperature has not reached the target temperature (step S380, NO), the processing returns to step S340.

On the other hand, in a case where the acquired ambient temperature has reached the target temperature (step S380, YES), the controller 101 starts performance of image forming processing according to the print job.

Next, the controller 101 acquires the rotation speed of the speed detection roller 70 and thus the conveyance speed of the long paper sheet P as a detection result of the speed detection section 76 (step S400).

Next, the controller 101 sets the speed (rotation speed) of the conveyance rollers that convey the long paper sheet P according to the speed difference between the target speed and the conveyance speed of the long paper sheet P acquired in step S400 to make the conveyance speed of the long paper sheet P the target speed (step S420).

Next, the controller 101 acquires the ambient temperature of the speed detection roller 70 as a detection result of the temperature detection section 74 (step S440).

Next, the controller 101 sets a heating amount of the sheet heating part 80 for heating the long paper sheet P that is conveyed according to the temperature difference between the target temperature and the ambient temperature of the speed detection roller 70 acquired in step S440 to make the ambient temperature of the speed detection roller 70 the target temperature (step S460).

Finally, the controller 101 determines whether the performance of the image forming processing according to the print job has been completed (step S480). In a case where the result of the determination indicates that the performance of the image forming processing according to the print job has not been completed (step S480, NO), the processing returns to step S400. On the other hand, in a case where the performance of the image forming processing according to the print job has been completed (step S480, YES), the image forming system 100 ends the conveyance control operation in FIG. 4.

Figure 5:
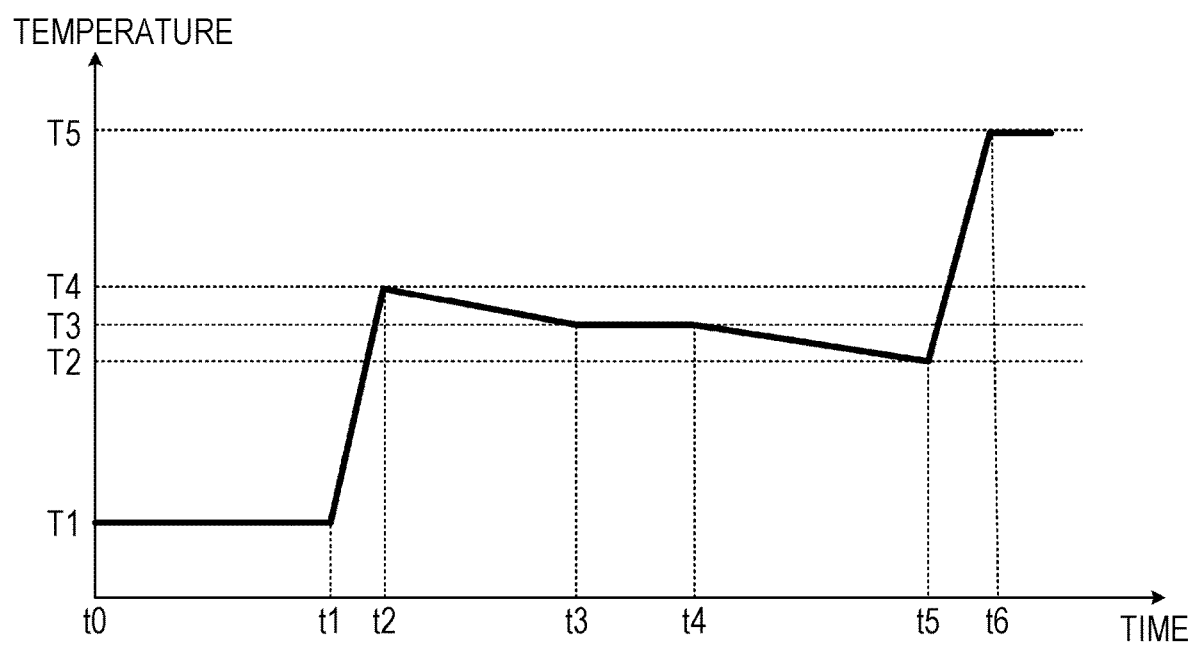
FIG. 5 is a diagram used for describing temperature change of a sheet being conveyed.

FIG. 5 is a diagram illustrating temperature change of a long paper sheet P from the start of conveyance from the sheet feeding apparatus 1 to the passage through the fixing nip when the long paper sheet P is preliminarily heated to make the ambient temperature of the speed detection roller 70 a target temperature. As illustrated in FIG. 5, sheet feeding operation of the long paper sheet P by the sheet feeding apparatus 1 is performed from time t0 to t1. A temperature T1 is a temperature of the long paper sheet P in the sheet feeding apparatus 1. Thereafter, the long paper sheet P being conveyed is preliminarily heated by the sheet heating part 80 (heater) from time t1 to t2. A temperature T4 is a heating temperature of the sheet heating part 80.

Thereafter, the long paper sheet P is conveyed to the position of the speed detection roller 70 on the conveyance path from time t2 to t3. At this time, decrease in the temperature of the long paper sheet P (temperature decrease from the temperature T4 to a temperature T3) due to heat absorption by the conveyance rollers is caused by the long paper sheet P being conveyed coming into contact with the conveyance rollers on the conveyance path. Thereafter, the long paper sheet P passes through the speed detection roller 70 while maintaining the temperature T3 (target temperature) from time t3 to time t4.

Thereafter, the long paper sheet P is conveyed to the position of the fixing nip on the conveyance path from time t4 to t5. At this time, decrease in the temperature of the long paper sheet P (temperature decrease from the temperature T3 to a temperature T2) due to heat absorption by the conveyance rollers is caused by the long paper sheet P being conveyed coming into contact with the conveyance rollers on the conveyance path. Finally, the long paper sheet P is heated to a temperature T5 (fixing temperature) by passing through the fixing nip from time t4 to t5.

As described with reference to FIG. 5, a long paper sheet P is preliminarily heated to the temperature T4 to make the temperature of a long paper sheet P a predetermined temperature when the speed detection roller 70 comes into contact with the long paper sheet P being conveyed, and when the speed detection roller 70 comes into contact with the long paper sheet P, decrease in the temperature of the speed detection roller 70 due to heat absorption by the long paper sheet P is reduced. As a result, the ambient temperature of the speed detection roller 70 is controlled to be a constant temperature (target temperature), and accordingly, controlling the conveyance speed of a long paper sheet P in consideration of a detection error of the speed detection roller 70 due to change in the ambient temperature of the speed detection roller 70, that is, correcting a control value of the conveyance speed of a long paper sheet P according to the change amount of the ambient temperature of the speed detection roller 70 is not necessary. As a result, occurrence of the control delay due to increase in the load of the control processing for controlling the conveyance speed of a long paper sheet P can be prevented.

The above mentioned embodiment is merely an example of implementation in making and using the present invention, and should not be considered as limitation of the interpretation of the technical scope of the present invention. That is, the present invention can be made and used in various forms without departing from the gist or the main features thereof.

Although embodiments of the present invention have been described and illustrated in detail, the disclosed embodiments are made for purposes of illustration and example only and not limitation. The scope of the present invention should be interpreted by terms of the appended claims.

What is claimed is:

1. A sheet conveyance apparatus comprising:
   a speed detection roller that detects a conveyance speed of a sheet, the speed detection roller being driven to rotate by coming into contact with the sheet being conveyed and by receiving a rotational force from the sheet being conveyed; and
   a hardware processor that performs temperature control to make an ambient temperature of the speed detection roller a predetermined temperature.

2. The sheet conveyance apparatus according to claim 1, further comprising
   a roller heating part that heats the speed detection roller,
   wherein the hardware processor controls the roller heating part to make an ambient temperature of the speed detection roller the predetermined temperature.

3. The sheet conveyance apparatus according to claim 2, wherein
   the roller heating part is a heater, and
   the hardware processor controls on/off of the heater to make an ambient temperature of the speed detection roller the predetermined temperature.

4. The sheet conveyance apparatus according to claim 1, further comprising
   a sheet heating part that heats the sheet,
   wherein the hardware processor controls the sheet heating part to make an ambient temperature of the speed detection roller the predetermined temperature.

5. The sheet conveyance apparatus according to claim 4, wherein
   the hardware processor controls the sheet heating part to make a temperature of the sheet the predetermined temperature when the speed detection roller comes into contact with the sheet being conveyed.

6. The sheet conveyance apparatus according to claim 4, wherein
   the hardware processor controls a heating amount of the sheet heating part according to a conveyance speed of the sheet that is conveyed.

7. The sheet conveyance apparatus according to claim 4, wherein
   the hardware processor controls a heating amount of the sheet heating part according to a temperature change amount of the speed detection roller when the speed detection roller comes into contact with the sheet being conveyed.

8. The sheet conveyance apparatus according to claim 4, wherein
   the hardware processor controls a heating amount of the sheet heating part according to a type of the sheet that is conveyed.

9. The sheet conveyance apparatus according to claim 1, wherein
   the sheet is a long paper sheet.

10. The sheet conveyance apparatus according to claim 1, wherein
    setting of the predetermined temperature is changeable.

11. The sheet conveyance apparatus according to claim 1, further comprising:
    a conveyance roller that conveys the sheet,
    wherein the hardware processor controls the conveyance roller to make a conveyance speed of the sheet detected by the speed detection roller a target speed.

12. An image forming apparatus comprising the sheet conveyance apparatus according to claim 1.

13. The image forming apparatus according to claim 12, further comprising:
    an image forming section configured to form a toner image on a paper sheet that is conveyed along a conveyance path; and
    a fixing section configured to fix the toner image to the paper sheet,
    wherein the image forming section is located between the speed detection roller and the fixing section along the conveyance path.

14. The image forming apparatus according to claim 13, wherein
    the image forming section includes an intermediate transfer belt disposed above the conveyance path, and
    the speed detection roller is disposed under the conveyance path.

* * * * *